US009096194B2

(12) United States Patent
Romero Elizondo et al.

(10) Patent No.: US 9,096,194 B2
(45) Date of Patent: Aug. 4, 2015

(54) SEATBELT RETRACTOR

(71) Applicant: TK HOLDINGS INC., Auburn Hills, MI (US)

(72) Inventors: Daniel Alejandro Romero Elizondo, Nuevo Leon (MX); Diego A. Tapia De Hoyos, Nuevo Leon (MX); Juan C. Veloz Soto, Durango (MX)

(73) Assignee: TK HOLDINGS INC., Auburn Hills, MI (US)

( * ) Notice: Subject to any disclaimer, the term of this patent is extended or adjusted under 35 U.S.C. 154(b) by 147 days.

(21) Appl. No.: 13/830,649

(22) Filed: Mar. 14, 2013

(65) Prior Publication Data

US 2013/0256443 A1    Oct. 3, 2013

Related U.S. Application Data

(60) Provisional application No. 61/616,388, filed on Mar. 27, 2012.

(51) Int. Cl.
*B60R 22/40* (2006.01)

(52) U.S. Cl.
CPC ........... *B60R 22/40* (2013.01); *B60R 2022/401* (2013.01)

(58) Field of Classification Search
USPC .............. 242/384, 384.2–384.6, 383.2–383.3
See application file for complete search history.

(56) References Cited

U.S. PATENT DOCUMENTS

| | | | |
|---|---|---|---|
| 3,921,931 A | 11/1975 | Levasseur | |
| 4,071,723 A | 1/1978 | Jackman | |
| 4,103,842 A * | 8/1978 | Martin et al. ................. | 242/384 |
| 4,238,087 A * | 12/1980 | Makishima ................ | 242/384.5 |
| 4,708,364 A * | 11/1987 | Doty ............................ | 280/806 |
| 4,867,390 A | 9/1989 | Joly | |
| 4,895,317 A * | 1/1990 | Rumpf et al. ................. | 242/384 |
| 6,915,979 B2 | 7/2005 | Webber et al. | |
| 2006/0180695 A1* | 8/2006 | Morgan et al. ............. | 242/384.4 |

FOREIGN PATENT DOCUMENTS

| | | |
|---|---|---|
| JP | 08-216832 A | 8/1996 |
| KR | 10-0215013 B1 | 8/1999 |

OTHER PUBLICATIONS

International Search Report dated Jul. 8, 2013 issued in connection with International Application No. PCT/US2013/033273.
Written Opinion of the International Searching Authority dated Jul. 8, 2013 issued in connection with International Application No. PCT/US2013/033273.

* cited by examiner

*Primary Examiner* — Sang Kim
(74) *Attorney, Agent, or Firm* — Foley & Lardner LLP

(57) ABSTRACT

A seat belt retractor comprising a rotating member, a moveable actuator configured to selectively interact with the rotating member in order to prohibit rotation of the rotating member in a seat belt withdrawing direction, an inertia sensing element, a guide member having a guide surface configured to guide the movement of the sensing element, and an electromagnetic element coupled to the guide member on an opposing side of the guide surface. The seat belt is configured to wind and unwind around the rotating member. When subject to a force due to acceleration, the sensing element is configured to move along the guide surface, where the electromagnetic element is configured to impart an electromagnetic force on the sensing element to retard the movement of the sensing element when the force due to acceleration is below a threshold.

12 Claims, 4 Drawing Sheets

US 9,096,194 B2

SEATBELT RETRACTOR

CROSS-REFERENCE TO RELATED PATENT APPLICATIONS

This application claims the benefit of and priority to U.S. Provisional Application No. 61/616,388, which was filed on Mar. 27, 2012. The foregoing U.S. provisional application is incorporated by reference herein in its entirety.

BACKGROUND

This application relates generally to the field of seat belt retractors configured for use in occupant restraint systems. More specifically, this application relates to retractors having improved acceleration sensing mechanisms.

SUMMARY

One embodiment relates to a seat belt retractor including a rotating member, an inertia sensing element, a guide member, and an electromagnetic element. The seat belt is configured to be wound and unwind around the rotating member to thereby permit at least a portion of the seat belt to be stored in the retractor or withdrawn from the retractor. The moveable actuator is configured to selectively interact with the rotating member in order to prohibit rotation of the rotating member in a seat belt withdrawing direction. The guide member includes a guide surface configured to guide the movement of the sensing element. The electromagnetic element is coupled to the guide member on an opposing side of the guide surface. When subject to a force due to acceleration, the sensing element is configured to move along the guide surface, where the electromagnetic element is configured to impart an electromagnetic force on the sensing element to retard the movement of the sensing element when the force due to acceleration is below a threshold.

Another embodiment relates to a seat belt retractor for an occupant restraint device. The retractor includes a rotating member, a housing including a first pivot and a second pivot, an actuator pivotally coupled to the housing at the first pivot, an inertia sensing element pivotally coupled to the housing at the second pivot, at least one ferromagnetic element fixed to the housing, and an electromagnetic element coupled to the sensing element at a distal end from the second pivot. The seat belt is configured to wind and unwind around the rotating member to thereby permit at least a portion of the seat belt to be stored in the retractor or withdrawn from the retractor. When subject to a force due to an acceleration, the sensing element is configured to pivot relative to the housing to in-turn rotate the actuator to selectively prohibit rotation of the rotating member in at least a seat belt withdrawing direction, where the electromagnetic element is configured to impart an electromagnetic force on the ferromagnetic element to retard the movement of the sensing element when the force due to the acceleration is below a threshold.

Yet another embodiment relates to a seat belt retractor including a rotating member, a housing, an actuator, an inertia sensing element pivotally coupled to the housing at a pivot, a dampening element, and an electromagnetic element. The seat belt is configured to wind and unwind around the rotating member to thereby permit at least a portion of the seat belt to be stored in the retractor or withdrawn from the retractor. The dampening element is made from an electrically conductive and non-magnetic material. The dampening element is coupled to one of the housing and the sensing element at a distal end relative to the pivot, and the electromagnetic element is coupled to the other of the one of the housing and the sensing element at the distal end. When subject to a force due to an acceleration, the sensing element is configured to pivot to in-turn move the actuator to selectively prohibit rotation of the rotating member in at least a seat belt withdrawing direction, where the electromagnetic element and the dampening element retard the movement of the sensing element, when the force due to the acceleration is below a threshold, through opposing magnetic fields.

BRIEF DESCRIPTION OF THE DRAWINGS

These and other features, aspects and advantages of the present invention will become apparent from the following description and the accompanying exemplary embodiments shown in the drawings, which are briefly described below.

DETAILED DESCRIPTION

Seat belt systems or assemblies may include a retractor having a mechanism configured to control the mode of operation of the retractor. For example, such a mechanism may be utilized with a seat belt retractor so that when a vehicle employing the seat belt retractor undergoes a predetermined acceleration or deceleration, an inertia sensing member senses the change in velocity relative to the change in time of the vehicle and shifts from a first (e.g., rest, non-locking, etc.) position to a second (e.g., moved, locking, etc.) position to facilitate the locking of the seat belt retractor. The inertia sensing member, when moved (e.g., shifted, pivoted, slid, etc.), may operate a lock member, such as, for example a lever or a pawl, which is configured to selectively engage (e.g., lock into) a geared or toothed wheel that can be operatively connected to a spool around which the seat belt or seat belt webbing is wound. When the inertia sensing member is shifted, the lock member locks into the wheel, and the spool is unable to rotate in at least the belt extraction (e.g., unwinding, etc.) direction that would be required for the seat belt webbing to be extracted or pulled out from the seat belt retractor.

Referring generally to the Figures, disclosed herein are retractors (e.g., retractor assemblies) including improved sensing mechanisms (e.g., acceleration sensors) that are configured to influence the movement of a sensing element (e.g., an inertia sensing element) by applying a force, such as a non-contact force from a magnetic field or magnetic dampening or damping, to the sensing element, such as to prevent or retard the movement of the sensing element below a predetermined threshold acceleration.

It is to be understood that the following detailed descriptions are exemplary and explanatory only, and are not restrictive of the invention disclosed herein.

As used herein, "acceleration" and "deceleration" are used interchangeably to denote a change in velocity of a vehicle over a change in time.

Figure 1:
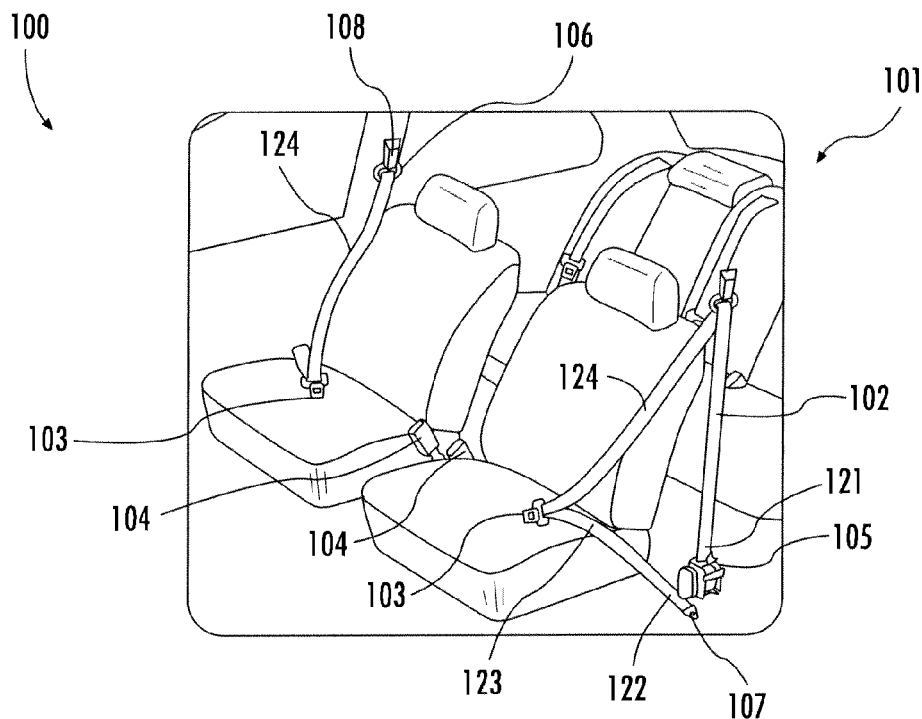
FIG. 1 is an isometric view of a portion of a vehicle interior showing a seat belt assembly, according to an exemplary embodiment.

FIG. 1 illustrates a portion of a vehicle interior 100 including an occupant restraint system 101 (e.g., a seat belt assembly) configured to restrain an occupant (not shown) of a passenger vehicle to a vehicle seat. The occupant restraint system 101 includes a belt 102 (e.g., seat belt, webbing, strap, etc.) and a retractor 105. As shown, the occupant restraint system 101 includes a seat belt 102, a tongue 103 (e.g., a tongue member, a latch plate, etc.), and a mating buckle 104 (e.g., a buckle mechanism, a locking mechanism, etc.) configured to receive and selectively lock the tongue 103. Upon attaching the tongue 103 to the buckle 104, the seat belt 102 is held (e.g., latched) across the vehicle occupant to secure the occupant to the vehicle seat. At one location in the vehicle, a first end 121 of the seat belt 102 is attached to a retractor 105 (e.g., a retractor 105, retractor mechanism, etc.). A second end 122 of the seat belt 102 is guided through a shoulder anchor 106 (e.g., D-ring, automatic turning loops, etc.) and through the tongue 103, and then attached to a fixed floor anchor 107. The occupant restraint system 101 further includes a height adjuster 108 that allows an occupant to adjust the angle at which the seat belt 102 lies across the occupant's torso by raising or lowering the shoulder anchor 106. It is noted that although the occupant restraint system 101 shown is a three-point system, the retractors disclosed herein may be used with any type of occupant restraint system, and are not limited to being used in three-point systems.

The seat belt 102 is configured to extend and retract across the vehicle occupant when the occupant is seated and the occupant restraint system 101 is in a buckled condition. The seat belt 102 can be composed of a fabric material (e.g., a woven nylon material) or another suitable material that is strong enough to withstand the forces of restraining an occupant during a vehicle acceleration. As shown in FIG. 1, the seat belt 102 is threaded through an opening in the tongue 103 (e.g., an opening in a latch plate or in a housing of the tongue) to slideably or adjustably couple the tongue 103 to the seat belt 102. Thus, the tongue 103 is able to slide with respect to the seat belt 102 when in an unbuckled position. The seat belt 102 is connected to a spool in the retractor 105 assembly, and the spool is configured to guide the winding and unwinding of the seat belt 102 relative to the retractor 105. The retractor 105 may include one or more than one biasing member, such as a plurality of springs (not shown), configured to pretension the seat belt 102 in the winding or retracting direction. For example, the retractor 105 may include a spiral spring (e.g., clock spring) configured to bias the spool in the seat belt winding direction.

The buckle 104 is fixed with respect to the vehicle, in that the buckle 104 may rotate about an end fixed to the vehicle. According to an exemplary embodiment, the buckle 104 is anchored to the vehicle frame so that the seat belt 102 is secured or locked in place when it is attached to the buckle 104. According to another exemplary embodiment, the buckle 104 is anchored to a seat of the vehicle. The buckle 104 includes a lock (e.g., a locking mechanism) to secure the tongue 103 to the buckle 104 until released, such as through a button or release. The lock of the buckle 104 may be configured to secure an engaging member, such as a latch plate or striker portion, of the tongue 103. The lock may be further configured to selectively release the engaging member of the tongue 103 either manually or automatically.

The tongue 103 may include an engaging member (e.g., latch plate, striker portion, etc.) and a housing (e.g., case). The housing of the tongue 103 may be composed of any suitable material, such as a hard plastic, soft foam and/or rubber material configured to deform upon applying pressure. The engaging member can be located on a leading portion or a perimeter of the tongue 103. The engaging member is configured to selectively engage (e.g., attach, couple, hook, connect, etc.) into the lock of the buckle 104 upon engagement to secure the tongue 103 (and seat belt 102) to the buckle 104. The engaging member may be composed any suitable material, such as chromatic steel, that is strong enough to withstand the forces of restraining an occupant during a vehicle acceleration.

When the tongue 103 and the buckle 104 are operatively coupled together (e.g., secured), the seat belt 102 may extend from the floor anchor 107, across the waist (e.g., lap) of the occupant, and pass through the opening in the tongue 103 (e.g., in the housing) to form a lap portion 123 of the seat belt 102 of the occupant restraint system 101. The seat belt 102 then crosses diagonally across the torso (e.g., chest, thorax) of the occupant to the shoulder anchor 106, forming a shoulder portion 124 of the seat belt 102 of the occupant restraint system 101. The seat belt 102 may then extend generally downward (e.g., vertically) from the shoulder anchor 106 to the retractor 105. The height of the shoulder anchor 106 determines an angle of the shoulder portion 124 (e.g., relative to the lap portion 123, horizontal, vertical, etc.) and the placement of the shoulder portion across the occupant.

According to an exemplary embodiment, the retractor (e.g., retractor 105) includes a rotating member, a moveable actuator, an inertia sensing element, a guide member, and an electromagnetic element. The rotating member may be configured as a spool, such that the seat belt 102 is configured to wind and unwind around the spool to thereby permit at least a portion of the seat belt 102 to be stored in the retractor or withdrawn from the retractor. The rotating member may include a locking gear 151 operatively coupled to the spool.

Figures 2A, 2B:
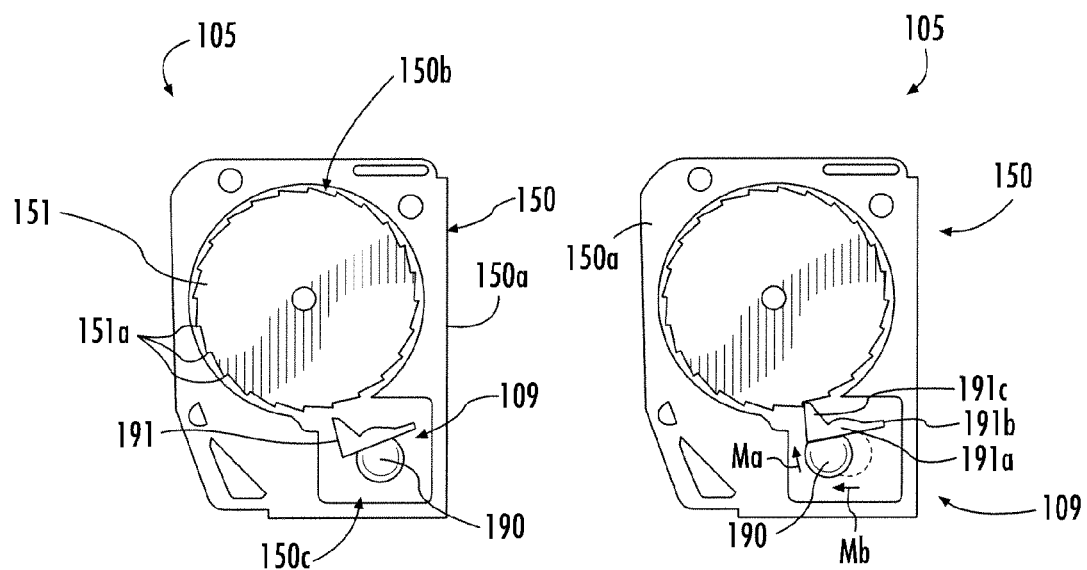
FIG. 2A is a schematic side view of an exemplary embodiment of a locking mechanism for a retractor shown in a first (or non-locking) configuration.
FIG. 2B is a schematic side view of the retractor locking mechanism of FIG. 2A shown in a second (or locking) configuration.

As shown in FIGS. 2A-2B, the retractor 105 includes a rotating member having a locking gear 151 and a spool (not shown) operatively coupled to the locking gear 151, a moveable actuator 191 configured to selectively interact with the rotating member (e.g., the locking gear 151) in order to prohibit rotation of the spool and/or locking gear 151 in a seat belt withdrawing direction, and an inertia sensing element 190. The retractor may also include a guide member having a guide surface configured to guide the movement of the sensing element, and an influencing element, such as an electromagnetic element, configured to impart a force, such as an electromagnetic force, on the sensing element 190 to retard the movement of the sensing element when a force (due to an acceleration) is imparted on the sensing element and is below a threshold. The sensing element 190 may be part of a sensing mechanism 109, such as along with the influencing element.

As shown, the retractor 105 also includes a frame 150. The frame 150 may include one or more than one wall 150a, such as a pair of opposing side walls 150a that pivotally support the rotatable spool and may be coupled to the vehicle (or seat). The frame 150 may have a first opening 150b configured to receive the locking gear 151 and a second opening 150c configured to receive the sensing mechanism 109. The first and second openings 150b, 150c may be provided in the wall 150a or other elements comprising the frame.

The guide member includes a guide surface configured to guide the movement of the sensing element. The electromagnetic element is coupled to the guide member on an opposing side of the guide surface. When subject to a force due to acceleration, the sensing element is configured to move along the guide surface, where the electromagnetic element is configured to impart an electromagnetic force on the sensing element to retard the movement of the sensing element when the force due to acceleration is below a threshold.

The retractor 105 may be configured to selectively lock the rotating member (e.g., the spool), such as to prohibit the seat belt 102 from extracting from the retractor during a vehicle acceleration. The retractor may include a frame, a locking mechanism to selectively lock the spool relative to the frame, and a sensing mechanism configured to sense a vehicle acceleration and upon sensing such an acceleration to drive (e.g., urge, move, actuate, etc.) the locking mechanism from a non-locking mode of operation, in which the spool can freely rotate, to a locking mode of operation, in which the spool is prohibited from rotation, such as in the seat belt extraction or unwinding direction.

The locking gear 151 is configured to be operatively coupled to the spool, either directly or indirectly through another element, such as a load limiting member (e.g., torsion bar). The locking gear 151 is configured to be engaged by a component (e.g., an actuator, pawl, catch, etc.) of the locking mechanism and/or the sensing mechanism to selectively lock the spool, and when the locking gear 151 is not engaged by the component of the locking mechanism, the spool is able to freely rotate. As shown, the locking gear 151 includes a plurality of teeth 151a provided around its periphery. The teeth 151a may be configured to have a ratcheting arrangement, such as to allow the locking gear 151 to rotate freely in a first direction (e.g., a winding direction), while prohibiting rotation in a second direction (e.g., an unwinding direction) when the locking gear is selectively engaged by the component. This ratcheting arrangement may allow pretensioning of the retractor when in the locking mode of operation.

The retractor 105 may also include a load limiting member, such as a torsion bar (not shown), that is configured to absorb energy by transmitting torque from the spool to the locking gear. For example, the torsion bar may have a first end operatively coupled to the spool to transmit torque therebetween, and a second end operatively coupled to the locking gear 151 to transmit torque therebetween. When the retractor 105 is in the non-locking mode of operation, the locking gear 151, torsion bar, and the spool rotate together in unison. When the retractor 105 is in the locking mode of operation and the locking gear 151 is prohibited from rotation, such that the spool may rotate in a seat belt unwinding (e.g., extraction) direction only upon a torque strong enough to overcome the torsional strength of the torsion bar. The seat belt 102 is tensioned by the movement of the occupant causing the rotation of the spool in the seat belt unwinding direction. If the rotational force exceeds the stress limit of the torsional portion of the torsion bar, the torsional portion of the torsion bar twists, allowing the spool to rotate for a predetermined angle. In this way, a portion of the impact energy to the occupant is absorbed by the torsion bar.

The sensing mechanism 109 (e.g., sensor assembly) may be coupled to the frame 150, such as to a wall of the frame, or may be coupled to a bracket that couples the sensing mechanism to the frame. The sensing mechanism 109 is configured to sense and react to an acceleration/deceleration of the vehicle by moving (e.g., driving, actuating, urging, etc.) an actuator (e.g., ratchet, pawl, stop, claw, lock, etc.) to engage the locking gear 151, such as the teeth 151a thereof to switch the retractor 105 from the non-locking mode of operation to the locking mode of operation.

According to an exemplary embodiment, the sensing mechanism 109 includes an inertia sensing element 190 and a moveable actuator 191 configured to selectively engage the teeth 151a of the locking gear 151. The inertia sensing element 190 detects (e.g., senses) the vehicle deceleration and reacts by moving (e.g., sliding, pivoting, rotating, etc.) from a first (e.g., nominal, neutral, etc.) position to a second (e.g., locking) position, in which the sensing element 190 in-turn moves the actuator 191 from a non-locking position to a locking position with respect to the locking gear 151. FIG. 2A shows the retractor 105 and the sensing mechanism 109 configured in the non-locking mode of operation, in which the sensing element 190 is in the nominal position and in which the actuator 191 is in the non-locking position. FIG. 2B shows the retractor 105 and the sensing mechanism 109 configured in the locking mode of operation, in which the sensing element 190 and the actuator 191 are in their locking positions. As shown, the sensing element 190 is configured as a sphere or ball. During a deceleration of the vehicle, the spherical sensing element 190 moves (e.g., rolls, slides, etc.) forward (from right to left in FIGS. 2A-2B) from the nominal position to the locking position (e.g., in a direction labeled by the arrow $M_b$ in FIG. 2B) and through contact with the actuator 191, moves (e.g., pivots, slides, etc.) the actuator 191 generally upward (e.g., in a direction labeled by the arrow $M_a$ in FIG. 2B) to selectively engage the locking gear 151.

As shown, the actuator 191 includes a body 191a, a pivot 191b, and a catch 191c. The body 191a is configured to contact the sensing element 190, such that movement of the sensing element 190 moves the actuator 191. The pivot 191b and the catch 191c may be configured at opposing sides of the body 191a, such as where the pivot 191b is provided on a first end of the body 191a and the catch 191c may be provided on a second distal end. The catch 191c is configured to directly engage the teeth 151a of the locking gear 151, such as the confronting tooth of the one-way ratchet teeth 151a, and accordingly may have a mating arrangement to provide proper engagement to facilitate proper locking.

The sensing mechanism 109 is configured to only activate over a predetermined threshold deceleration (e.g., an acceleration greater than 0.3 g or 0.3 G). It is noted that the unit "g" (or "G") is used herein to denote a value of the acceleration of gravity at the earth's surface (i.e., g=9.81 m/s$^2$=32.2 ft/s$^2$=G). At low accelerations (i.e., accelerations below the threshold acceleration), the actuator 191 of the sensing mechanism 109 is configured to remain in the non-locking position (i.e., not to engage the locking gear 151), so that the spool is allowed to freely rotate to allow unwinding and winding of the seat belt. The sensing mechanism 109 may achieve the threshold acceleration by influencing (e.g., retarding, dampening, damping, etc.) the movement of the sensing element 190. The sensitivity of the ball sensor is influenced by the mass of the ball, gravity, and friction between the ball and the surrounding components (e.g., guide member, actuator) of the sensing mechanism 109. Further, the sensing mechanism 109 may include additional elements to influence the movement of the sensing element 190, such as the elements discussed below.

Figure 3:
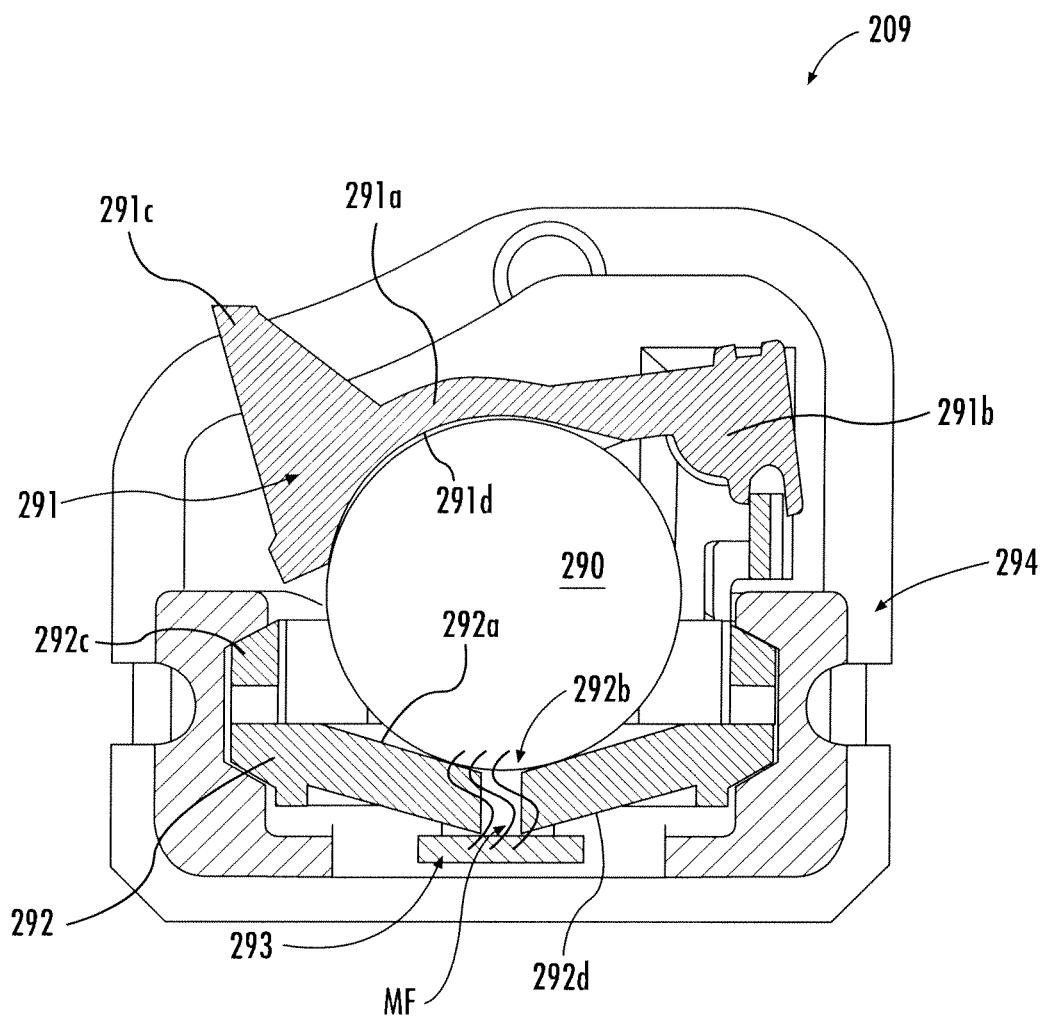
FIG. 3 is cross-sectional view of a sensor mechanism for a retractor including a ball sensor, according to an exemplary embodiment.

FIG. 3 illustrates another exemplary embodiment of a sensing mechanism 209 for use in a retractor, such as the retractor 105. The sensing mechanism 209 is configured as a ball type sensor, including a spherical shaped inertia sensing element 290. As shown, the sensing mechanism 209 also includes a moveable actuator 291, a guide member 292, and an influencing element 293 (e.g., an electromagnetic element).

The sensing element 290 is configured to move from a nominal position to a locking position, upon a vehicle deceleration, to move the actuator 291 from a non-locking position to a locking position with respect to the locking gear (e.g., locking gear 151) of the retractor. Accordingly to an exemplary embodiment, the sensing element 290 is made from a ferromagnetic material in order to be influenced by a magnetic field. For example, the sensing element 290 may include iron, nickel, cobalt, or any other suitable ferromagnetic material. The sensing element 290 may be made from a steel.

The actuator 291 is configured to selectively engage the retractor, such as to switch the retractor from a non-locking mode of operation to a locking mode of operation. For example, the actuator 291 may selectively engage the teeth 151*a* of the locking gear 150 of the retractor 105. As shown in FIG. 3, the actuator 291 includes a body 291*a*, a pivot 291*b*, and a catch 291*c*. The body 291*a* includes a contact surface 291*d* (shown as a lower surface) that is configured to contact the sensing element 290. As shown, the contact surface 291*d* is a curved surface that is similar to the shape of a portion of the sensing element 290 that contacts the contact surface 291*d*. In other words, the contact surface 291*d* may surround a portion of the sensing element 290, such that movement of the sensing element 290 toward the end of the actuator 291 with the catch 291*c* is configured to move the actuator 291 (and the catch 291*c*) upward in order for the catch 291*c* to engage the locking gear. Thus, the catch 291*c* may be configured to directly engage the teeth 151*a* of the locking gear 151 and may have a configuration that mates with the teeth. The pivot 291*b* may be configured on an opposing end of the actuator 291 as the catch 291*c* to increase the pivot arm length to increase the movement of the actuator 291.

The guide member 292 is configured to support the sensing element 290. The guide member 292 includes a guide surface 292*a* that is configured to guide the movement of the sensing element. The guide surface 292*a* may be configured as a curved surface, and as shown in FIG. 3, is configured as a concave curved surface. The concave curved guide surface 292*a* may include a bottom most portion on which the spherical shaped sensing element may rest in the nominal position. Thus, the concave guide surface 292*a* may be an upper surface of the guide member. The guide surface 292*a* may also include an opening 292*b*. As shown, the concave curved guide surface 292*a* includes a central opening 292*b* aligned with a nominal position of the spherical sensing element 290, such that the sensing element 290 is disposed over the central opening 292*b* in the nominal position.

The guide member 292 may also include a stop member 292*c* that is configured to limit the movement of the sensing element. As shown in FIG. 3, the stop member 292*c* is an annular member that extends upward from the guide surface, such as from a periphery of the guide surface. The stop member 292*c* may also help couple the guide member 292 to a housing.

The electromagnetic element 293 is configured to impart a force on the sensing element 290 to influence (e.g., retard, slow) the movement of the sensing element without directly contacting the sensing element. In other words, the electromagnetic element 293 imparts a non-contact force to influence the movement of the sensing element 290. According to an exemplary embodiment, the electromagnetic element 293 imparts an electromagnetic force on the sensing element 290 to retard the movement of the sensing element below a predetermined threshold acceleration. As shown in FIG. 3, the electromagnetic element 293 imparts the electromagnetic force MF on the sensing element 290, where the electromagnetic force MF passes through the guide member 292 to influence the sensing element 290. Accordingly, the electromagnetic element 294 may be configured as a magnet that induces a magnetic field. As a magnet, the electromagnetic element 294 applies a non-contact magnetic force induced by a magnetic field to the ferromagnetic sensing element 290, which may bias the sensing element 290 against the guide member 292. This arrangement may advantageously reduce movement of the sensing element 290 due to vehicle vibrations and due to accelerations below the predetermined threshold. The electromagnetic element 294 configured as a magnet therefore may eliminate or substantially reduce the likelihood that the sensing element 290 configured as a ball sensor will trigger the actuator 291 at an acceleration below the threshold acceleration, and reduces noise caused by the sensing element 290 vibrating against other components of the retractor 105, such as the guide member 292.

As shown, the electromagnetic element 293 is coupled to the guide member 292 on a side 292*d* that is opposite the guide surface 292*a*. The electromagnetic element 293 may be centrally located relative to the apex of the underside of the guide member (e.g., the convex side opposite the concave curved guide surface 292*a*) and/or to the central opening 292*b* in the guide member 292. Alternatively, the electromagnetic element 293 may be coupled to another component of the retractor, such as to the casing of the sensing mechanism 209, to the housing of the retractor 105, or another component near enough to the sensing element 290 such that the electromagnetic element 293 is able to apply a sufficient magnetic force to the sensing element 290.

The sensing mechanism 209 may further include a housing 294 (e.g., casing) that is configured to couple the sensing mechanism 209 to the retractor. The housing 294 may be configured to support the guide member 292, and the actuator 291 may be pivotally coupled to the housing 294, such as by the pivot 291*b*.

Figure 4:
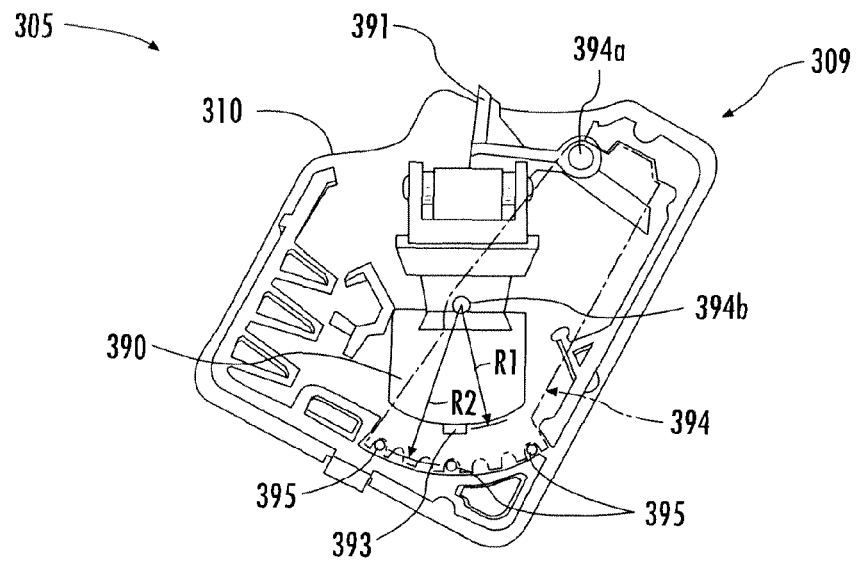
FIG. 4 is a side view of a sensor mechanism for a retractor including a pendulum sensor, according to another exemplary embodiment.
Figure 5:
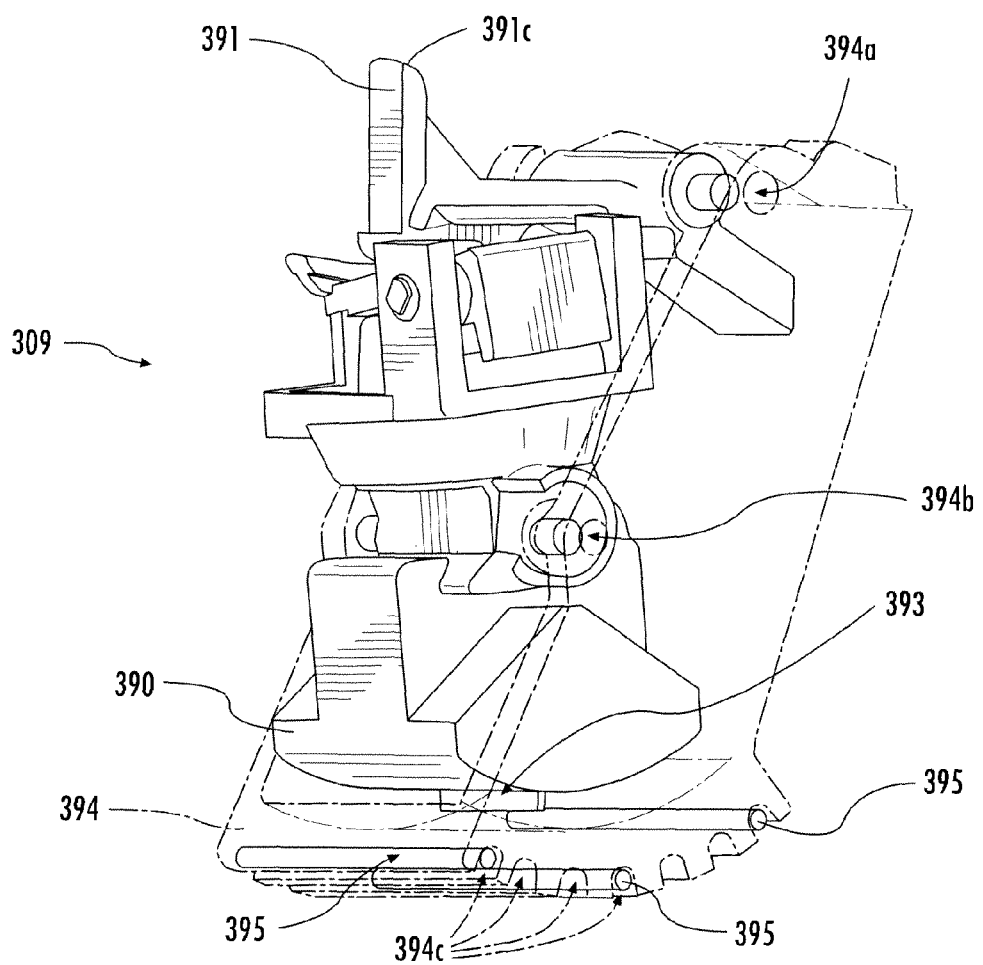
FIG. 5 is an isometric view of the sensor mechanism of FIG. 4.

FIGS. 4-5 illustrate another exemplary embodiment of a retractor 305 for use in an occupant restraint system. The retractor 305 may include a sensing mechanism 309 configured to detect or sense a vehicle deceleration that induces a force above a threshold, and upon such sensing such a force, the sensing mechanism 309 may switch the retractor from a non-locking configuration to a locking configuration.

The retractor 305 may include a rotating member, a housing 394 (e.g., holder, frame, bracket, casing, etc.) including a first pivot 394*a* and a second pivot 394*b*, an actuator 391 pivotally coupled to the housing 394 at the first pivot 394*a*, an inertia sensing element 390 pivotally coupled to the housing 394 at the second pivot 394*b*, at least one ferromagnetic element 395 fixed to the housing 394, and an electromagnetic element 393 coupled to the sensing element 390 at a distal end from the second pivot 394*b*. The rotating member may include a locking gear (e.g., the locking gear 151) and/or a spool. The seat belt is configured to wind and unwind around the rotating member to thereby permit at least a portion of the seat belt to be stored in the retractor or withdrawn from the retractor 305. When subject to a force due to an acceleration, the sensing element 390 is configured to pivot relative to the housing 394 to in-turn rotate the actuator 391 to selectively prohibit rotation of the rotating member in at least a seat belt withdrawing direction, where the electromagnetic element 393 is configured to impart an electromagnetic force on the ferromagnetic element 395 to retard the movement of the sensing element 390 when the force due to the acceleration is below a threshold.

Thus, the sensing mechanism 309 may include a sensing element 390 configured as a pendulum inertia sensor that is pivotally coupled to the housing 394 at the second pivot 394*b*, at least one ferromagnetic element 395 fixed to the housing 394, and an electromagnetic element 393 coupled to the sensing element 390 at a distal end 390a from the second pivot 394b. As shown in FIGS. 4 and 5, the sensing mechanism 309 includes three ferromagnetic elements fixed to the housing 394 at three different locations.

During a deceleration of the vehicle, the pendulum sensing element 390 moves (e.g., sways, rotates, pivots, etc.) toward the direction of deceleration (e.g., forward) and moves the actuator 391 to engage and lock the locking gear 151 of the retractor 105. As shown, the sensing element 390 is configured to pivot relative to the housing 394 when subjected to an acceleration to in-turn rotate the actuator 391 to selectively engage and lock the retractor 105 (e.g., the locking gear 151). Moreover, the electromagnetic element 393 is configured to impart an electromagnetic force on the ferromagnetic element 395 to retard the movement of the sensing element 390 below a predetermined threshold acceleration, such as 0.3 g.

As shown, the actuator 391 is supported by the first pivot 394a at an upper end of the housing 394 and in such a manner that the actuator 391 lifted by the movement of the pendulum sensing element 390. The actuator 391 includes an engaging member 391c, which may be disposed on an opposite side relative to the first pivot 394a. The engaging member 391c of the actuator 391 may be configured to engage a tooth of the locking gear 151 to lock rotation of the locking gear 151.

The electromagnetic element 393 may be coupled to the lower end of the sensing element 390. The sensing element 390 being configured as a pendulum rotates relative to the second pivot 394b of the housing, such that the electromagnetic element 393 rotates about the second pivot 394b (e.g., a pivot axis defined by the second pivot 394b) along a first radius R1, as shown in FIG. 4.

Each ferromagnetic element 395 may be arranged at a distance from the second pivot 394b. As shown, each of the three ferromagnetic elements 395 are arranged along a second radius R2. In other words, each ferromagnetic element 395 is located at a substantially similar distance from the pivot of the electromagnetic element 393. The second radius R2 may be configured to be greater than the first radius R1, and the offset distance may be changed to tailor the strength of the magnetic forces that retard (e.g., dampen) the movement of the sensing element 390. It is noted that the sensing mechanism having more than one ferromagnetic element may locate the ferromagnetic elements at different distances, such as, for example, to provide a tailored (e.g., reduced, greater) magnetic field at different locations along the arc of the swinging sensing element 390.

Additionally, for the sensing mechanism 309 having more than two ferromagnetic elements 395, a spacing (e.g., arc length) between each adjacent pair of ferromagnetic elements may be common (i.e., the same spacing) or may be different. As shown, the spacing between each adjacent pair of ferromagnetic elements 395 has the same arc length and is the same. This spacing may provide an indexed influence over the movement of the sensing element 390. For example, the ferromagnetic elements 395 positioned at the ends may act to limit the rotational travel of the sensing element 390 and/or help retain the sensing element 390 in the locking position.

Each ferromagnetic element 395 (e.g., magnetically attracted member) may be configured as a pin (e.g., rod, shaft, etc.). For example, each ferromagnetic element 395 may be a steel pin, which may be coupled to a lower portion of the housing 394. The housing 394 may include a feature that is configured to receive and retain at least one ferromagnetic element 395 to maintain its position relative to the housing 394. As shown, the housing 394 includes a plurality of channels 394c (e.g., sockets, receiving sections, etc.) disposed along the bottom thereof. Each channel 394c may have a generally U-shaped cross-section, a generally C-shaped cross section, or another suitable shape to help fix at least one ferromagnetic element 395 to the housing 394. Each channel 394c may extend generally parallel to the pivot axis of the second pivot 394b.

The electromagnetic element 393 applies a non-contact dampening force (e.g., an electromagnetic force) to each ferromagnetic element 395 indexing (e.g., aligning, holding) the sensing element 390 at various positions (e.g., angular positions) relative to the housing 394, such as at a first (e.g., design, nominal, neutral, etc.) position in which the actuator 391 does not engage the locking gear 151 and a second (e.g., tilted, locking, etc.) position in which the actuator 391 engages the locking gear 151. The electromagnetic element 393 may therefore eliminate or substantially reduce the likelihood that the pendulum sensing element 390 will sway forward from the nominal position to trigger the actuator 391 at an acceleration below the threshold acceleration. As shown, the ferromagnetic elements 395 are received in the channels 394c along the lower end of the housing 394 so that the indexed positions of the sensing element 390 may be adjusted (e.g., tailored) by moving the reconfigurable (e.g., adjustable) ferromagnetic elements 395 into different channels 394c.

The retractor 305 may further include a member configured to couple the housing 394 to the retractor 305, such as its frame. As shown in FIG. 4, the retractor 305 includes a member 310 configured to couple the housing 394 to the retractor 305. The member 310 may be a cover that is configured to be coupled to the frame of the retractor and cover the sensing mechanism 309, such as within an opening in the frame. However, the member may be configured differently, such as a bracket.

Figure 6:
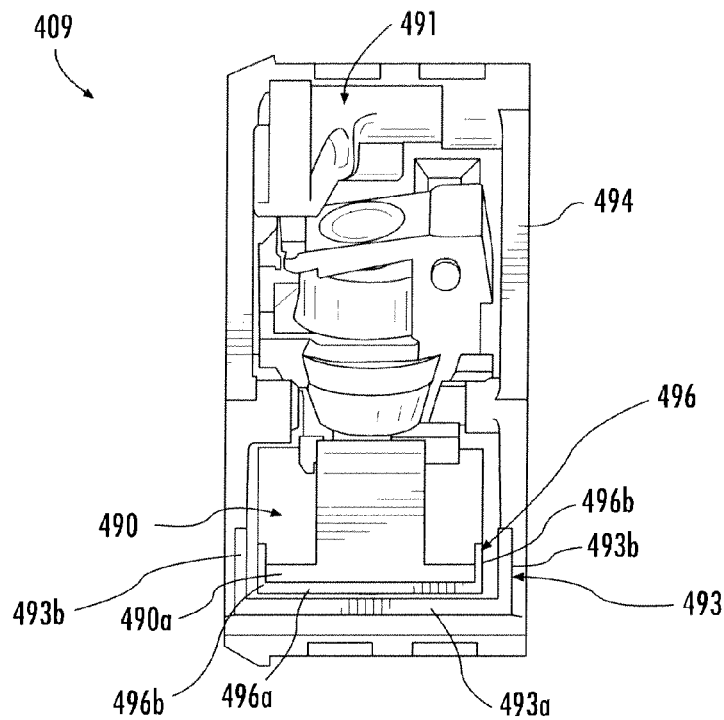
FIG. 6 is a front view of a sensor mechanism for a retractor including a pendulum sensor, according to another exemplary embodiment.
Figure 7:
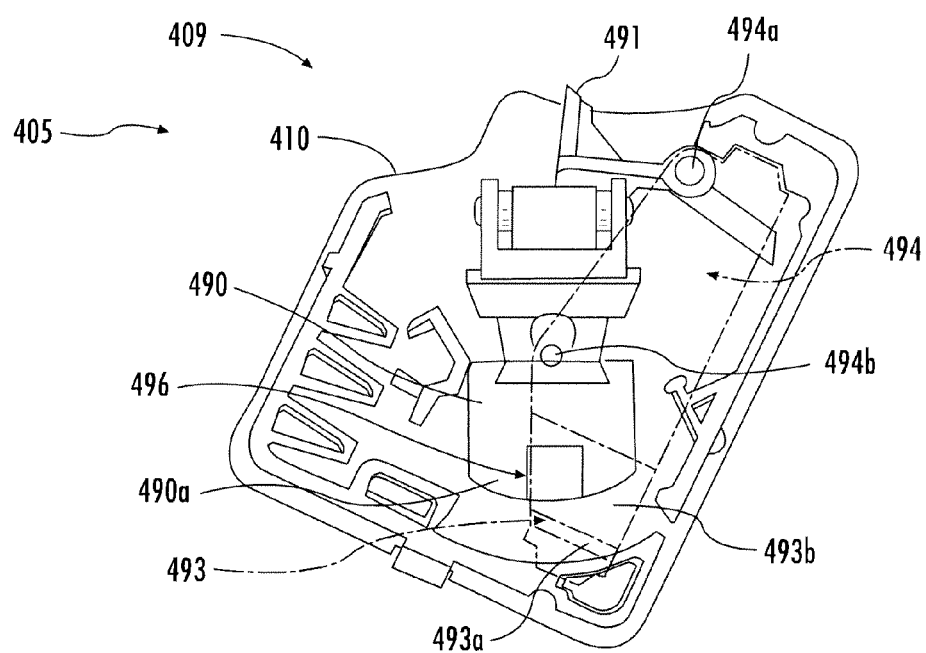
FIG. 7 is a side view of the sensor mechanism of FIG. 6.

FIGS. 6-7 illustrate another exemplary embodiment of a retractor 405. The retractor 405 may include a rotating member about which the seatbelt is configured to wind and unwind. The retractor 405 may also include a sensing mechanism 409, which may include a housing 494, an actuator 491 pivotally coupled to the housing 494 at a first pivot 494a, an inertia sensing element 490 pivotally coupled to the housing 494 at a second pivot 494b, a dampening element 496, and an electromagnetic element 493. The sensing element 490 may be configured as a pendulum sensing element similar to the sensing mechanism 309 shown in FIGS. 4-5. When subject to a force due to an acceleration, the sensing element 490 is configured to pivot to in-turn move the actuator 491 to selectively prohibit rotation of the rotating member in at least a seat belt withdrawing direction, where the electromagnetic element and the dampening element retard the movement of the sensing element through opposing magnetic fields, when the force due to the acceleration is below a threshold.

The dampening element 496 may be made from an electrically conductive and non-magnetic material (e.g., copper, aluminum, etc.). The dampening element 496 may be coupled to one of the housing 494 and the sensing element 490, such as at a distal end 490a relative to the second pivot 494b. The electromagnetic element 493 may be coupled to the other of the one of the housing 494 and the sensing element 490. For example, the electromagnetic element 493 may be coupled to the sensing element 490 at the distal end relative to the second pivot 494b and the dampening element 496 may be coupled to the housing 494 at a location that is adjacent to and offset from the dampening element 496. Alternatively, the dampening element 496 may be coupled to the sensing element 490 at the distal end relative to the second pivot 494b, and the electromagnetic element 493 may be coupled to the housing 494 at a location that is adjacent to and offset from the dampening element 496. As shown, the dampening element 496 is disposed at an outer periphery of a lower end (e.g., a lower surface) of the sensing element 490.

Alternatively, the sensing element 490 and the dampening element 496 may be integrally formed. For example, the sensing element 490 may be composed of an electrically conductive and non-magnetic material, and therefore the sensing mechanism 409 would not include an additional dampening element, since the sensing element 490 would self dampen. In other words, the pendulum (e.g., sensing element) may be formed of or coupled to an electrically conductive and non-magnetic material.

The dampening element 496 may include a base 496a disposed at the lower surface of the sensing element 490 and opposing side walls 496b that extend perpendicular to the base 496a. Moreover, the electromagnetic element 493 may have a similar configuration that includes a base 493a that is generally offset from the base 496a of the dampening element 496, and the electromagnetic element 493 may further include opposing side walls 493b. Each side wall 493b of the electromagnetic element 493 may be located adjacent to one side wall 496b of the dampening element 496. This arrangement may advantageously provide stronger forces and/or more repeatable forces that influence the movement of the sensing element 490.

The sensing element 490 of the sensing mechanism 409 is configured to pivot relative to the housing 494 when subjected to an acceleration to in-turn rotate the actuator 491, such as to selectively engage the locking gear 151. The electromagnetic element 493 and the dampening element 496 cooperate to retard (e.g., dampen) the movement (e.g., pivoting) of the sensing element 490 below a threshold acceleration. For example, the electromagnetic element 493 applies a non-contact dampening force to the non-magnetic metal of the dampening element 496 (or sensing element 490), which is formed by a magnetic field induced by a current, where the magnetic field opposes a second field from the electromagnetic element, such as through Lenz's law. Every time the pendulum sensing element 490 moves (e.g., swings, sways, rotates, etc.), an eddy current will be induced in the non-magnetic material, creating a magnetic field opposite of the field of the magnet. At low accelerations, this magnetic force overcomes the angular acceleration of the pendulum sensing element. The electromagnetic element may therefore reduce the likelihood that the pendulum sensing element will sway forward from the design position to trigger the actuator at an acceleration below the threshold acceleration. According to other exemplary embodiments, positions of the conductive, non-magnetic material and the electromagnetic element may be reversed, with the electromagnetic element being coupled to the pendulum sensing element and the conductive, non-magnetic material being coupled to the housing.

The various exemplary retractors are configured to not lock (e.g., remain unlocked) in response to accelerations below a predetermined threshold acceleration (e.g., 0.3 g). The addition of the electromagnetic element applies a dampening force to the sensing mechanism either directly through magnetic attraction or through an induced magnetic field. The retractors as disclosed herein are also configured to lock in response above the threshold acceleration.

By increasing resistance to movement of a pendulum sensing element from the rest or nominal position with an electromagnetic element, the tilt lock angle at which the pendulum sensing element causes the actuator to engage the locking gear may be reduced.

By providing a magnetic field to bias a pendulum sensing element toward the tilt lock angle, the relative effect of friction in the system, the safety factor of the system and the sensitivity of the sensing mechanism may be reduced.

By introducing a magnetic field to a steel ball sensing element, the ball sensing element will be pulled against a neighboring component to increase resistance to movement and reduce noise (e.g., from vibration).

It is important to note that the construction and arrangement of the acceleration sensors for the seat belt retractors as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A seat belt retractor for an occupant restraint device, comprising:
    a rotating member, wherein the seat belt is configured to wind and unwind around the rotating member to thereby permit at least a portion of the seat belt to be stored in the retractor or withdrawn from the retractor;
    a housing including a first pivot and a second pivot;
    an actuator pivotally coupled to the housing at the first pivot;
    an inertia sensing element pivotally coupled to the housing at the second pivot;
    a plurality of separated ferromagnetic elements fixed to the housing; and
    an electromagnetic element coupled to the sensing element at a distal end from the second pivot;
    wherein, when subject to a force due to an acceleration, the sensing element is configured to pivot relative to the housing to in-turn rotate the actuator to selectively prohibit rotation of the rotating member in at least a seat belt withdrawing direction; and
    wherein the electromagnetic element is configured to impart an electromagnetic force on each ferromagnetic element to retard the movement of the sensing element when the force due to the acceleration is below a threshold.

2. The retractor of claim 1, wherein the sensing element is a pendulum configured to rotate relative to the housing, such that the electromagnetic element rotates about a pivot axis of the second pivot along a first radius.

3. The retractor of claim 2, wherein the each ferromagnetic element is configured as a rod that is retained by the housing.

4. The retractor of claim 3, wherein each rod is contained within a separate channel of the housing.

5. The retractor of claim 4, wherein each adjacent pair of ferromagnetic elements are offset by an arc length that is common to the arc lengths of the other adjacent pairs of ferromagnetic elements.

6. A seat belt retractor for an occupant restraint device, comprising:
   a rotating member, wherein the seat belt is configured to wind and unwind around the rotating member to thereby permit at least a portion of the seat belt to be stored in the retractor or withdrawn from the retractor;
   a housing including a first pivot and a second pivot;
   an actuator pivotally coupled to the housing at the first pivot;
   an inertia sensing element pivotally coupled to the housing at the second pivot
   at least one ferromagnetic element fixed to the housing, wherein each ferromagnetic element is configured as a rod that is retained in a channel in the housing; and
   an electromagnetic element coupled to the sensing element at a distal end from the second pivot
   wherein, when subject to a force due to an acceleration, the sensing element is configured to pivot relative to the housing to in-turn rotate the actuator to selectively prohibit rotation of the rotating member in at least a seat belt withdrawing direction;
   wherein the electromagnetic element is configured to impart an electromagnetic force on the ferromagnetic element to retard the movement of the sensing element when the force due to the acceleration is below a threshold;
   wherein the sensing element is a pendulum configured to rotate relative to the housing, such that the electromagnetic element rotates about a pivot axis of the second pivot along a first radius; and
   wherein the at least one ferromagnetic element includes a plurality of separated ferromagnetic elements with each ferromagnetic element fixed to the housing.

7. The retractor of claim 6, wherein each ferromagnetic element of the plurality of ferromagnetic elements is arranged on a second radius from the pivot axis of the second pivot, and wherein the second radius is greater than the first radius.

8. The retractor of claim 7, wherein each adjacent pair of ferromagnetic elements are offset by an arc length that is common to the arc lengths of the other adjacent pairs of ferromagnetic elements.

9. A seat belt retractor for an occupant restraint device, comprising:
   a rotating member, wherein the seat belt is configured to wind and unwind around the rotating member to thereby permit at least a portion of the seat belt to be stored in the retractor or withdrawn from the retractor;
   a housing including a first pivot and a second pivot;
   an actuator pivotally coupled to the housing at the first pivot;
   an inertia sensing element pivotally coupled to the housing at the second pivot;
   an electromagnetic element coupled to the sensing element at a first radius from the second pivot; and
   a plurality of separated ferromagnetic elements provided at a second radius from the second pivot, wherein each adjacent pair of ferromagnetic elements is offset by an arc length;
   wherein, when subject to a force due to an acceleration, the sensing element is configured to pivot relative to the housing to in-turn rotate the actuator to selectively prohibit rotation of the rotating member in at least a seat belt withdrawing direction; and
   wherein the electromagnetic element is configured to impart an electromagnetic force on each ferromagnetic element to retard the movement of the sensing element when the force due to the acceleration is below a threshold.

10. The retractor of claim 9, wherein each ferromagnetic element is configured as a rod that is retained in a channel in the housing.

11. The retractor of claim 9, wherein the second radius is greater than the first radius.

12. The retractor of claim 9, wherein the sensing element is a configured to rotate relative to the housing, such that the electromagnetic element rotates about a pivot axis of the second pivot along the first radius.

* * * * *